United States Patent
Lee et al.

(10) Patent No.: US 10,350,702 B2
(45) Date of Patent: Jul. 16, 2019

(54) METHOD FOR WELDING DISSIMILAR METALS, DISSIMILAR METALLIC BUSBAR MANUFACTURED USING SAME, AND SECONDARY BATTERY COMPRISING SAME

(71) Applicant: LG CHEM, LTD., Seoul (KR)

(72) Inventors: Jinsoo Lee, Daejeon (KR); Taesu Kim, Daejeon (KR); Sangyoon Jeong, Daejeon (KR); Bugon Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 702 days.

(21) Appl. No.: 14/903,027

(22) PCT Filed: Jul. 9, 2014

(86) PCT No.: PCT/KR2014/006164
§ 371 (c)(1),
(2) Date: Jan. 5, 2016

(87) PCT Pub. No.: WO2015/005676
PCT Pub. Date: Jan. 15, 2015

(65) Prior Publication Data
US 2016/0151853 A1    Jun. 2, 2016

(30) Foreign Application Priority Data

Jul. 9, 2013   (KR) .................. 10-2013-0080449
Jul. 8, 2014   (KR) .................. 10-2014-0085445

(51) Int. Cl.
*B23K 9/23*      (2006.01)
*B23K 26/00*   (2014.01)
(Continued)

(52) U.S. Cl.
CPC ............ *B23K 20/10* (2013.01); *B23K 20/233* (2013.01); *B23K 20/2336* (2013.01);
(Continued)

(58) Field of Classification Search
CPC .. B23K 20/10; B23K 20/233; B23K 20/2336; B23K 2201/38; B23K 2203/10;
(Continued)

(56) References Cited

U.S. PATENT DOCUMENTS

| | | | |
|---|---|---|---|
| 3,402,254 A | 9/1968 | Parker et al. | |
| 5,027,360 A * | 6/1991 | Nabors | H01S 3/10092 372/18 |
| 2013/0072075 A1* | 3/2013 | Kayamoto | C23C 28/021 439/887 |

FOREIGN PATENT DOCUMENTS

| | | |
|---|---|---|
| CN | 1217964 A | 6/1999 |
| JP | 10-291080 A | 11/1998 |

(Continued)

OTHER PUBLICATIONS

Machine Translation JP 2002-151045, Sawa et al., Bus Bar for Battery Module and Battery Module, May 24, 2002.*

*Primary Examiner* — Dana Ross
*Assistant Examiner* — James F Sims, III
(74) *Attorney, Agent, or Firm* — Dentons US LLP

(57) ABSTRACT

Disclosed is a method of welding dissimilar metals, including: preparing a dissimilar metal bus bar composed of a plate-shaped first member made of a first metal and a plate-shaped second member made of a second metal disposed under the first member; folding one side of the dissimilar metal bus bar so that a portion of the second member is located on a portion of the first member; welding a lead made of the first metal on the first member; and welding a lead made of the second metal to the second member located on the portion of the first member, thus (Continued)

solving cracking or corrosion problems of a conventional welding process and also welding an over-lay clad metal with leads, thereby generating economic benefits and increasing the convenience of the welding process.

9 Claims, 4 Drawing Sheets

(51) Int. Cl.
| | |
|---|---|
| *B23K 15/00* | (2006.01) |
| *B23K 20/10* | (2006.01) |
| *B23K 26/22* | (2006.01) |
| *B23K 26/32* | (2014.01) |
| *B23K 20/233* | (2006.01) |
| *B23K 26/244* | (2014.01) |
| *B23K 101/38* | (2006.01) |
| *B23K 103/10* | (2006.01) |
| *B23K 103/12* | (2006.01) |
| *B23K 103/18* | (2006.01) |

(52) U.S. Cl.
CPC ............ *B23K 26/22* (2013.01); *B23K 26/244* (2015.10); *B23K 26/32* (2013.01); *B23K 2101/38* (2018.08); *B23K 2103/10* (2018.08); *B23K 2103/12* (2018.08); *B23K 2103/18* (2018.08)

(58) Field of Classification Search
CPC    B23K 2203/12; B23K 2203/18; B23K 26/22; B23K 26/244; B23K 26/32; B23K 26/0626; B23K 26/323
USPC ..................................................... 219/137 R
See application file for complete search history.

(56) References Cited

FOREIGN PATENT DOCUMENTS

| | | | |
|---|---|---|---|
| JP | 2002-151045 A | | 5/2002 |
| JP | 2008084803 | * | 4/2005 |
| JP | 2005-288481 A | | 10/2005 |
| JP | 2011-233273 A | | 11/2011 |
| JP | 2014-094386 A | | 5/2014 |
| KR | 10-2011-0109779 A | | 10/2011 |
| KR | 10-2011-0109843 A | | 10/2011 |
| WO | 2011/073980 A1 | | 6/2011 |

* cited by examiner

METHOD FOR WELDING DISSIMILAR METALS, DISSIMILAR METALLIC BUSBAR MANUFACTURED USING SAME, AND SECONDARY BATTERY COMPRISING SAME

CROSS-REFERENCE

This application is a National Stage Application of International Application No. PCT/KR2014/006164, filed Jul. 9, 2014, and claims priority to and the benefit of Korean Patent Application No. 10-2014-0085445, filed on Jul. 8, 2014 and Korean Patent Application No. 10-2013-0080449, filed Jul. 9, 2013, the contents of each which are incorporated by reference in their entirety for all purposes as if fully set forth below.

TECHNICAL FIELD

The present invention relates to a method of welding dissimilar metals and a dissimilar metal bus bar manufactured thereby. More particularly, the present invention relates to a method of welding dissimilar metals, wherein any one side of a laminate comprising dissimilar metals is folded and welded, and to a dissimilar metal bus bar manufactured thereby.

BACKGROUND ART

A rechargeable secondary battery is receiving attention as a power source for electric vehicles (EVs), hybrid electric vehicles (HEVs), and plug-in HEVs, which are proposed to overcome air pollution problems of conventional gasoline and diesel vehicles.

Such a secondary battery is used by electrically connecting a plurality of battery cells. As such, the battery cells are connected in such a manner that a bus bar, an anode lead and a cathode lead necessary for electrical connection thereof are linked.

However, when anode and cathode leads made of dissimilar metals are welded to the bus bar, an intermetallic compound between dissimilar metals may be formed, and thus brittleness may increase, undesirably increasing the risk of cracking. Furthermore, when changes in temperature and environment continuously occur, the intermetallic compound between dissimilar metals may grow, whereby the welded portion may crack or may corrode with an increase in resistance. To solve such problems, mainly utilized is a method of connecting the dissimilar metal bus bar and the leads made of dissimilar metals using a clad metal formed by pressure welding. Such a welding method using a clad metal is disclosed in Korean Patent Application Publication No. 10-2011-0109779.

However, the conventional welding method using a clad metal requires an additional process for welding between dissimilar metals, undesirably increasing the manufacturing cost and imposing limitations on process convenience. Hence, a method of welding dissimilar metals needs to be improved.

DISCLOSURE

Technical Problem

The present invention has been made keeping in mind the above problems encountered in the related art, and an object of the present invention is to provide a method of welding dissimilar metals, wherein one side of a laminate made up of dissimilar metals is folded so as to enable the welding of the same metals, thereby preventing a welded portion from cracking or corroding with an increase in resistance due to the growth of an intermetallic compound between dissimilar metals, and also an over-lay clad metal may be welded with leads, thus generating economic benefits and improving the convenience of the welding process.

Technical Solution

In order to accomplish the above objects, the present invention provides a method of welding dissimilar metals, comprising: preparing a dissimilar metal bus bar comprising a plate-shaped first member made of a first metal and a plate-shaped second member made of a second metal disposed under the first member; folding one side of the dissimilar metal bus bar so that a portion of the second member is located on a portion of the first member; welding a lead made of the first metal on the first member; and welding a lead made of the second metal to the second member located on the portion of the first member.

In addition, the present invention provides a dissimilar metal bus bar comprising a plate-shaped first member made of a first metal and a plate-shaped second member made of a second metal disposed under the first member, wherein the dissimilar metal bus bar includes a folded portion formed by folding one side of the dissimilar metal bus bar so that a portion of the second member is located on a portion of the first member, a lead made of the first metal is welded on the first member, and a lead made of the second metal is welded to the second member.

In addition, the present invention provides a lithium secondary battery, comprising the bus bar as above.

Advantageous Effects

According to the present invention, a method of welding dissimilar metals can prevent a welded portion from cracking or corroding with an increase in resistance due to the growth of an intermetallic compound between dissimilar metals. Furthermore, an over-lay clad metal can be welded with leads, thus generating economic benefits and improving the convenience of the welding process.

BEST MODE

Hereinafter, a detailed description will be given of the present invention.

According to the present invention, a method of welding dissimilar metals comprises: preparing a dissimilar metal bus bar comprising a plate-shaped first member made of a first metal and a plate-shaped second member made of a second metal disposed under the first member; folding one side of the dissimilar metal bus bar so that a portion of the second member is located on a portion of the first member;

welding a lead made of the first metal on the first member; and welding a lead made of the second metal to the second member located on the portion of the first member.

The method of welding dissimilar metals according to the present invention may be applied to welding of various dissimilar metals, especially welding of a laminate structure comprising sequentially stacked dissimilar metals with metal leads made of the dissimilar metals. Specifically, the method of welding dissimilar metals according to the present invention may be applied to the welding of a dissimilar metal bus bar comprising a plate-shaped first member made of a first metal and a plate-shaped second member made of a second metal disposed under the first member with metal leads made of the dissimilar metals.

The dissimilar metals are not particularly limited, and preferably, the first metal is copper and the second metal is aluminum.

In the present invention, the dissimilar metal bus bar comprising the plate-shaped first member made of the first metal and the plate-shaped second member made of the second metal disposed under the first member may be provided in the form of a clad metal. The clad metal may be an in-lay clad metal or an over-lay clad metal. Preferably useful is an over-lay clad metal.

Figure 2:
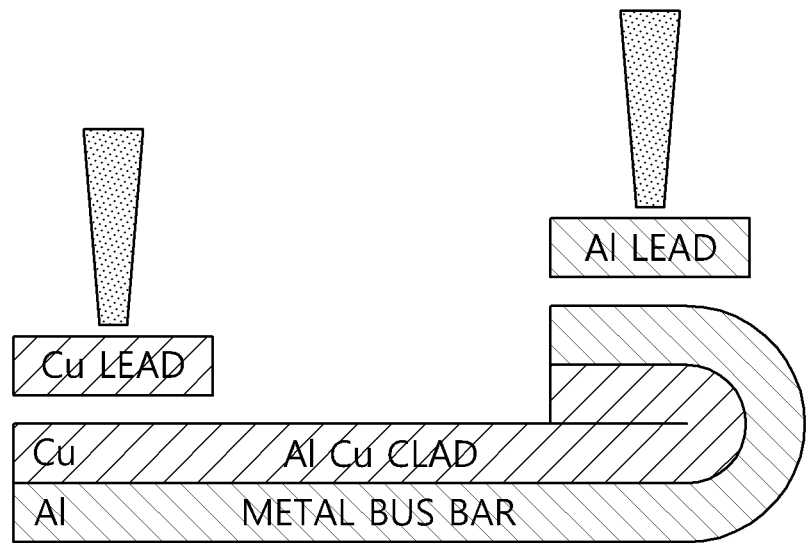
FIG. 2 schematically illustrates a process of welding dissimilar metals according to the present invention.

In the method of welding dissimilar metals according to the present invention, as illustrated in FIG. 2, one side of the dissimilar metal bus bar is folded so that a portion of the second member is located on a portion of the plate-shaped first member made of the first metal. When one side of the bus bar is folded in this way, the first member made of the first metal and the lead made of the first metal may be directly welded, and the second member made of the second metal and the lead made of the second metal may be directly welded. Hence, the formation of an intermetallic compound due to the welding of dissimilar metals may be prevented, and thus cracking due to increased brittleness may be remarkably reduced. As mentioned above, when one side of the dissimilar metal bus bar is folded so that the second member is located on a portion of the plate-shaped first member made of the first metal, a width of the portion of the second member located on the portion of the first member is equal to or greater than a welding width of the dissimilar metal bus bar and is equal to or less than the width of a welding jig. If the width thereof is less than the welding width, a welding area may decrease and thus bondability may deteriorate. In contrast, if the width thereof is greater than the width of the welding jig, the amount of metal used may be increased, undesirably enlarging the size of the bus bar.

In the method of welding dissimilar metals according to the present invention, when the lead made of the first metal is welded to the first member or when the lead made of the second metal is welded to the second member, at least one welding process selected from the group consisting of ultrasonic welding, laser welding, e-beam welding, and arc welding may be applied.

According to the present invention, a dissimilar metal bus bar comprising a plate-shaped first member made of a first metal and a plate-shaped second member made of a second metal disposed under the first member includes a folded portion formed by folding one side of the dissimilar metal bus bar so that a portion of the second member is located on a portion of the first member, and a lead made of the first metal is welded on the first member, and a lead made of the second metal is welded to the second member.

Although the dissimilar metals are not particularly limited, the first metal may be copper and the second metal may be aluminum.

In the present invention, the dissimilar metal bus bar configured such that the plate-shaped second member made of the second metal is disposed under the plate-shaped first member made of the first metal may be provided in the form of a clad metal. As such, the clad metal may be an in-lay clad metal or an over-lay clad metal. Preferably useful is an over-lay clad metal.

As illustrated in FIG. 2, the dissimilar metal bus bar according to the present invention includes a folded portion formed by folding one side of the dissimilar metal bus bar so that the second member is located on a portion of the plate-shaped first member made of the first metal. When one side of the bus bar is folded in this way, it is possible to directly weld the first member made of the first metal and the lead made of the first metal, and also to directly weld the second member made of the second metal and the lead made of the second metal, thereby preventing the formation of an intermetallic compound due to the welding of dissimilar metals, ultimately considerably reducing the generation of cracking attributed to increased brittleness. As mentioned above, when the second member is located on a portion of the plate-shaped first member made of the first metal by folding one side of the dissimilar metal bus bar, a width of the portion of the second member located on the portion of the first member is equal to or greater than a welding width of the dissimilar metal bus bar and is equal to or less than the width of a welding jig. If the width thereof is less than the welding width, a welding area may become small and thus poor bondability may result. In contrast, if the width thereof is greater than the width of the welding jig, the metal may be used in an increased amount, and thus the size of the bus bar may become large.

In the dissimilar metal bus bar according to the present invention, when the lead made of the first metal is welded to the first member or when the lead made of the second metal is welded to the second member, at least one welding process selected from the group consisting of ultrasonic welding, laser welding, e-beam welding, and arc welding may be carried out.

As for ultrasonic welding, ultrasonic vibration of 20~60 KHz may be applied.

Also, laser welding may be performed at a welding rate of 50~200 mm/s using a continuous wave (CW) laser having a laser energy density of 150~650 kJ/cm$^2$ and an optical system. Preferably, laser welding is carried out at a welding rate of 80~120 mm/s using a CW laser having a laser energy density of 300~550 kJ/cm$^2$ and an optical system.

Furthermore, when laser welding is implemented using such a CW laser, laser oscillation may be modulated to a predetermined frequency in order to prevent thermal damage to the welding material due to continuous exposure to heat. As such, a modulation frequency may be 8 Hz~5 kHz, and laser oscillation upon modulation may correspond to 30~90% of the modulation frequency. For example, when 50% oscillation is used for 1 kHz modulation, laser output modulation at an interval of 1 ms is conducted, which means that 500 us corresponding to a laser oscillation state and 500 us corresponding to no laser oscillation state are repeated.

According to the present invention, a lithium secondary battery includes the dissimilar metal bus bar as above, and thereby a plurality of battery cells, which are electrically connected, may be used, thus exhibiting superior bondability and reducing the generation of an intermetallic compound between dissimilar metals, ultimately decreasing corrosion or cracking.

Mode for Invention

The following examples of the present invention are disclosed for illustrative purposes, but those skilled in the art will appreciate that various modifications, additions and substitutions are possible, without departing from the scope and spirit of the invention as disclosed in the accompanying claims.

EXAMPLE

Manufacture of Bus Bar

Example 1

As illustrated in FIG. 2, one side of an over-lay clad metal configured such that an aluminum plate was disposed under a copper plate was folded, after which an aluminum lead was located on the aluminum position, and a copper lead was located on the copper position, followed by welding at a welding rate of 100 mm/s using a CW laser (a modulation frequency of 1 kHz, 50% output of the modulation frequency) having a laser energy density of 400~500 kJ/cm$^2$ and an optical system.

Comparative Example 1

Figure 1:
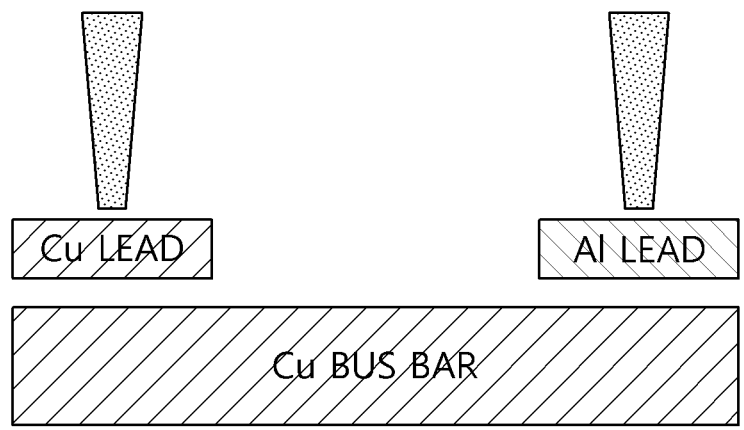
FIG. 1 schematically illustrates a conventional process of welding dissimilar metals.

As illustrated in FIG. 1, an aluminum lead and a copper lead were located on both ends of a copper plate, and then individually welded at a welding rate of 100 mm/s using a CW laser (a modulation frequency of 1 kHz, 50% output of the modulation frequency) having a laser energy density of 400~500 kJ/cm$^2$ and an optical system.

Test Example

Test Example 1: Evaluation of Formation of Dissimilar Compound

Figure 3:
FIG. 3 shows SEM photo of Comparative Example 1.
Figure 4:
FIG. 4 shows SEM photo of Example 1.

The surface of the welded bus bars of Example 1 and Comparative Example 1 was observed using a scanning electron microscope (SEM). As illustrated in FIG. 3, the dissimilar metal compound was produced upon welding of the copper bus bar. However, as illustrated in FIG. 4, the laser welding of the clad metal bus bar did not produce the dissimilar metal compound.

Test Example 2: Tensile Strength and Salt Spray Corrosion Testing

Figure 5:
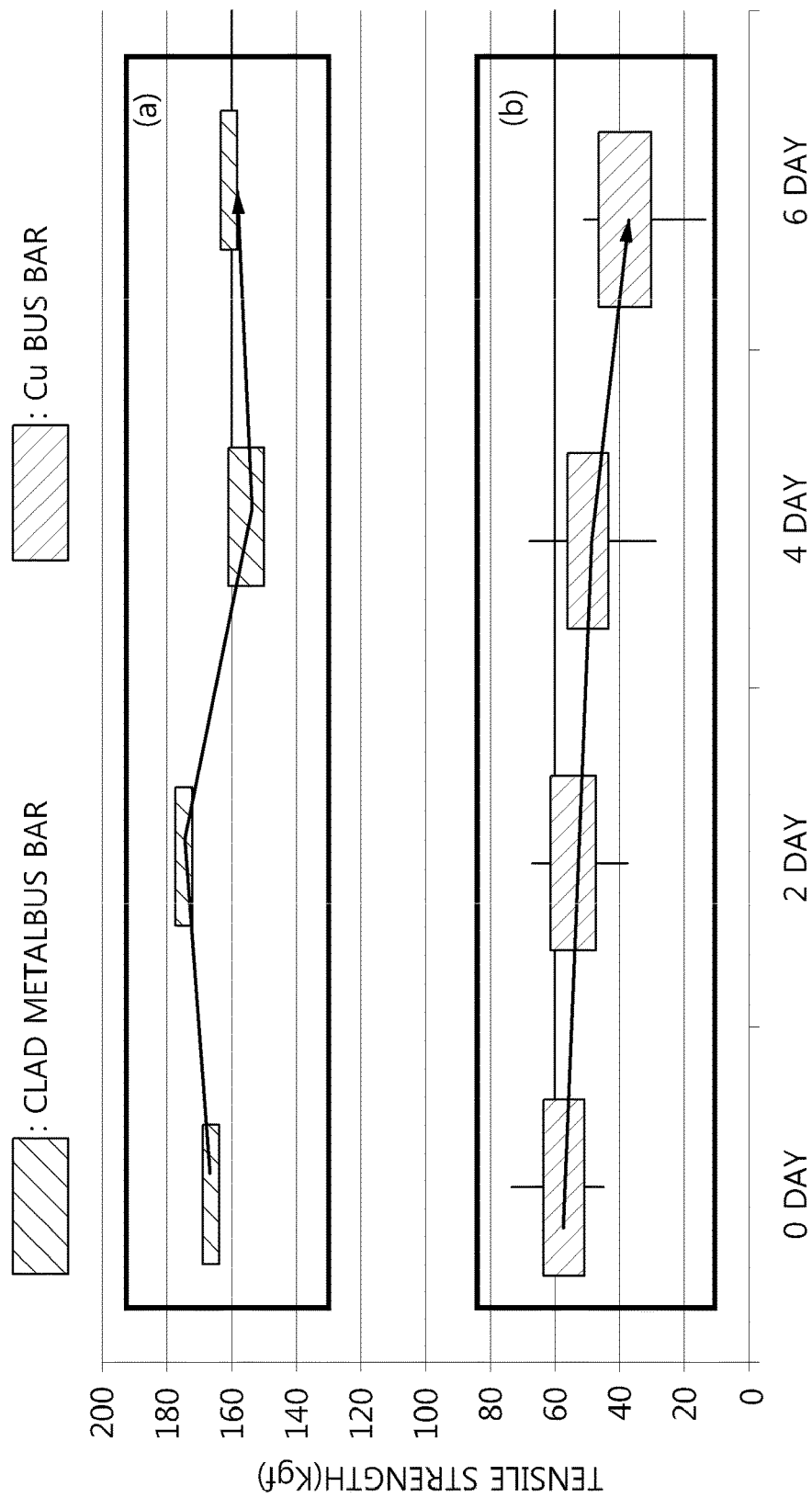
FIG. 5 shows tensile strengths of the welded bus bars in Example 1 and Comparative Example 1.

The tensile strength of the welded bus bars of Example 1 and Comparative Example 1 was measured. The results are shown in FIG. 5. As illustrated in FIG. 5, when the clad metal bus bar was subjected to laser welding, it had a tensile strength of 160 Kgf or more, which was much higher than 60 Kgf of the welded copper bus bar.

Furthermore, 0.6 mol salt spray corrosion testing was performed. Changes in welding strength over time are illustrated in FIG. 5. As illustrated in FIG. 5, changes in tensile strength over time were significant in the copper bus bar but were insignificant in the clad metal bus bar.

The invention claimed is:

1. A method of welding dissimilar metals, comprising:
preparing a dissimilar metal bus bar comprising a plate-shaped first member made of a first metal and a plate-shaped second member made of a second metal disposed under the first member;
folding one side of the dissimilar metal bus bar so that a portion of the second member is located on a portion of the first member;
welding a lead made of the first metal on the first member; and
welding a lead made of the second metal to the second member located on the portion of the first member,
wherein the first metal is copper, and the second metal is aluminum, and
wherein the welding is performed using laser welding, and the laser welding is performed at a welding rate of 80~120 mm/s using a continuous wave (CW) laser having a laser energy density of 300~500 kJ/cm$^2$ and an optical system.

2. The method of claim 1, wherein the dissimilar metal bus bar comprises a clad metal.

3. The method of claim 2, wherein the clad metal is an over-lay clad metal.

4. The method of claim 1, wherein the CW laser has a modulation frequency of 8 Hz~5 kHz, and is oscillated at 30~90% of the modulation frequency.

5. A dissimilar metal bus bar comprising a plate-shaped first member made of a first metal and a plate-shaped second member made of a second metal disposed under the first member,
wherein the dissimilar metal bus bar includes a folded portion formed by folding one side of the dissimilar metal bus bar so that a portion of the second member is located on a portion of the first member,
wherein a lead made of the first metal is welded on the first member, and a lead made of the second metal is welded to the second member,
wherein the first metal is copper, and the second metal is aluminum, and
wherein the welding is performed using laser welding, and the laser welding is performed at a welding rate of 80~120 mm/s using a continuous wave (CW) laser having a laser energy density of 300~500 kJ/cm$^2$ and an optical system.

6. The dissimilar metal bus bar of claim 5, wherein the CW laser has a modulation frequency of 8 Hz~5 kHz, and is oscillated at 30~90% of the modulation frequency.

7. The dissimilar metal bus bar of claim 5, wherein the dissimilar metal bus bar comprises a clad metal.

8. The dissimilar metal bus bar of claim 7, wherein the clad metal is an over-lay clad metal.

9. A lithium secondary battery, comprising the bus bar of claim 5.

* * * * *